United States Patent [19]
Mons

[11] Patent Number: 5,920,874
[45] Date of Patent: *Jul. 6, 1999

[54] INFORMATION TRANSFER METHOD, INFORMATION CARRIER, ARRANGEMENT FOR TRANSMITTING AND ARRANGEMENT FOR RECEIVING INFORMATION

[75] Inventor: Johannes J. Mons, Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/558,515

[22] Filed: Nov. 16, 1995

[30] Foreign Application Priority Data

Nov. 18, 1994 [BE] Belgium ............................... 09401045

[51] Int. Cl.⁶ ...................................................... G06F 17/30
[52] U.S. Cl. ............................................ 707/205; 707/100
[58] Field of Search ..................................... 395/621, 611, 395/613, 615, 440, 550, 428, 375; 386/125, 46, 70, 51; 371/30; 707/100, 101, 102, 103, 104, 205

[56] References Cited

U.S. PATENT DOCUMENTS

| | | | |
|---|---|---|---|
| 4,357,635 | 11/1982 | Hasegawa | 360/51 |
| 5,019,816 | 5/1991 | Hosono | 341/77 |
| 5,241,671 | 8/1993 | Reed et al. | 395/621 |
| 5,418,918 | 5/1995 | Vander Kamp et al. | 395/375 |
| 5,574,564 | 11/1996 | Timmermans | 386/46 |
| 5,583,640 | 12/1996 | Timmermans | 386/125 |
| 5,592,640 | 1/1997 | Minoura et al. | 395/428 |
| 5,621,743 | 4/1997 | Tomisawa | 371/30 |
| 5,627,657 | 5/1997 | Park | 386/70 |
| 5,630,111 | 5/1997 | Yoshida | 395/550 |
| 5,651,087 | 7/1997 | Nagano et al. | 386/51 |

OTHER PUBLICATIONS

Pphillips et al, The Implementation Methodology for a CD–ROM English Document Database, IEEE, pp. 484–487, Dec. 1993.

Hudson, Experiences Rom Production of a Cross–Platform Multimedia CD, IEEE, pp. 194–202, Jan. 1994.

Sammartino et al, Desktop Multimedia Communications—Breaking The Chains, IEEE, pp. 73–77, Dec. 1991.

Tsujimura et al, CD Software Specifications for Vehicle Information Display System CDCraft, IEEE, pp. 16–24, Dec. 1990.

Primary Examiner—Thomas G. Black
Assistant Examiner—Frantz Coby
Attorney, Agent, or Firm—Edward Blocker

[57] ABSTRACT

Information of a specific application, such as, CD-ROM or CD-DA is organized according to a specific information structure and also contains application data related thereto. There is disclosed a method of transferring information organized according to one or more information structures with an information signal subdivided into blocks. The header of each block contains an application code and application data, while the structure of the application data depends on the application code. According to a layered hierarchical structure the blocks are organized in groups having a group application code and the groups are organized in a volume having a volume application code. The invention makes it possible to know the information structure at any moment. Furthermore, an information carrier is described on which such an information signal is recorded. Also an arrangement for receiving and an arrangement for transmitting such information signals are described.

33 Claims, 5 Drawing Sheets

| Pos | +0 | +1 | +2 | +3 | Size |
|---|---|---|---|---|---|
| 4 | CRC | | Reserved | | 4 |
| 8 | Address | | | | 4 |
| 12 | Track Number | | Reserved | | 4 |
| 16 | Application Code | Application Data | | | 20 |
| | | | | Total: | 32 |

FIG. 6

| Byte Position | Size (Bytes) | Field name |
|---|---|---|
| 1 | 4 | System Identification — 71 |
| 5 | 4 | |
| 9 | 48 | Disc Entry — 72 |
| 57 | 16 | |
| 73 | 64 | |
| 137 | 32 | |
| 169 | 96 | |
| 265 | 120 | |
| 385 | 16 | Track Entry 1 — 73 |
| . | . | .. |
| 385+(N-1)*16 | 16 | Track Entry N — 73 |
| . | . | .. |
| 2033 | 16 | Track Entry 104 |

FIG. 7

| Byte Position | Size (Bytes) | Field name |
|---|---|---|
| 9 | 1 | |
| 10 | 1 | |
| 11 | 1 | |
| 12 | 2 | Number of Track |
| 14 | 1 | Disc Application ID — 6 |
| 15 | 16 | |
| 31 | 2 | |
| 33 | 2 | |
| 35 | 4 | |
| 39 | 2 | |
| 41 | 16 | Reserved |

FIG.8

| Byte Position | Size (Bytes) | Field name |
|---|---|---|
| M | 4 | Track Start Address |
| M+4 | 4 | Track End Address |
| M+8 | 1 | |
| M+9 | 1 | Track Application Code — 5 |
| M+10 | 4 | |
| M+14 | 2 | |

INFORMATION TRANSFER METHOD, INFORMATION CARRIER, ARRANGEMENT FOR TRANSMITTING AND ARRANGEMENT FOR RECEIVING INFORMATION

BACKGROUND OF THE INVENTION

The invention relates to a method of transferring information by an information signal that represents the information organized in one or more information structures, in which the information signal is subdivided into blocks and in which the information signal contains application data relating to the information.

The invention further relates to an information carrier on which an information signal is recorded that represents information organized in one or more information structures, in which the information signal is subdivided into blocks and the information signal contains application data relating to the information.

The invention further relates to an arrangement for transmitting and an arrangement for receiving information, both to be used in the method.

Such a method and information carrier are used in the known CD-ROM system which is described in detail in Standard ECMA-130, Data Interchange on Read-Only 120 mm Optical Data Disks. In the known method the information signal representing information i.e. audio information or digital data, is recorded on the known information carrier, the Compact Disc. An apparatus reads the information signal from the information carrier and recovers the information for a destination. When digital data are transferred, the information signal is subdivided into blocks. In addition to the information, so-defined application data can be transferred by sub-code channels on the CD-ROM. These application data contain information relating to the audio information or digital data, such as a subdivision into tracks, play time or catalogue number.

A condition of the known method is that for the information processing the information structure is to be known at the destination end. It is impossible to determine the information structure of the transferred information in a simple manner. In addition, the sub-code channels are less suitable for transferring application data due to the different signal processing.

SUMMARY OF THE INVENTION

It is an object of the invention, for example, to provide means by which information and application data can be transferred to a destination without the need to know the information structure in advance.

According to a first aspect of the invention a method of the type defined in the opening paragraph is characterized in that the application data are contained in the blocks and in that each block contains an application code that is indicative of the information structure, while the structure of the application data depends on the application code.

The invention is advantageous in that the information structure of each block is known without the need to analyze at another instant information from blocks that have a different information structure and without the need to store the result in a memory.

There should be observed that the control field of the CD-ROM subcode q-channel carries application data relating to the audio mode, such as the number of channels and pre-emphasis or no pre-emphasis. A certain value then indicates that digital data are present. This value is thus to be adhered to in the case of CD-ROM (ECMA-130, par 22.3.1), but in fact only indicates that there is no audio information present and that there is a transparent digital transfer channel. For the case of CD-ROM, this channel is used in known fashion in that the information signal is subdivided into blocks. Each block contains a mode indicator which indicates either of the two possible error correction systems, or an empty block. Such a mode indicator is not considered an application code, because this mode indicator does not relate at all to the information structure of the transferred information, but only concerns the parameters of the information transfer channel. A destination does not have the disposal of this mode indicator and thus cannot derive anything about the information structure from this mode indicator.

The invention is furthermore advantageous in that the application data become available simultaneously with the information they relate to.

The invention has a further advantage in that the information density during information transfer may be high, because the manner in which the symbols represent the information can be chosen with minimum redundancy for each information structure.

The invention has an additional advantage in that the information density of the application data may be high, because the manner in which the symbols represent the application data can be chosen with minimum redundancy for each information structure.

Furthermore, the invention is advantageous in that it is possible to transfer information having different information structures to different destinations, or in that a destination can select the information intended for that destination from the supplied information flow.

Furthermore, the invention is advantageous in that, if blocks have gone lost during the information transfer, the information structure of each block is known immediately after the information transfer has been resumed.

A further advantage of the invention is that, without any modifications of the arrangement, the method will be suitable for transferring information that has new information structures which have not yet been established so far. It is well-nigh impossible to design a universal information structure that comprises all the desired applications known at a certain moment and which, additionally, is suitable for extension for future applications. A method or information carrier, for which information is contained in a stream of universal, for example, digital, symbols, cannot be arranged for such a universal information structure. However, such a method or information carrier can be universal indeed, if the information structure can be distinctly recognized from a block itself, which block is the smallest meaningful set of symbols. The information of a new information structure can then be transferred alternately with the information structures already determined previously.

An embodiment for the method in which the information structure comprises one or more sub-structures is characterized in that the sub-structure in each block depends on the application data. This embodiment is advantageous in that the information density is very high, because the manner in which the symbols represent the information can be chosen with minimum redundancy for each sub-structure of an information structure. At the point of destination the information processing can then be simply tuned to that particular sub-structure.

A further embodiment for the method, in which the information signal is subdivided into groups and a group contains a plurality of blocks, is characterized in that the group contains a group application code that relates to all the blocks of that particular group. This embodiment is advantageous in that an arrangement knows from the group application code the information structure for a period of time and need not analyze the application code of each block.

A further embodiment for the method is characterized in that the group application code is equal to the application code of each of the blocks in that particular group and has a predetermined value if the blocks in the group have different application codes. This embodiment is advantageous in that an arrangement can derive from the group application code whether the application code in the blocks under consideration will vary.

A further embodiment for the method, in which the information signal is subdivided into volumes and a volume comprises a plurality of groups, is characterized in that the volume has a volume application code that relates to all the groups of that particular volume. This embodiment is advantageous in that an arrangement can derive from the volume application code the information structure for a period of time and need not analyze the application code of each group.

A further embodiment for the method is characterized in that the volume application code is equal to the group application code of each of the groups in that particular volume and has a predetermined value if the groups in the volume have different group application codes. This embodiment is advantageous in that an arrangement can derive from the volume application code whether the group application code in the groups under consideration will vary.

According to a second aspect of the invention an information carrier of the type defined in the opening paragraphs is characterized in that the application data are included in the blocks and in that each block contains an application code indicating the information structure, while the structure of the application data depends on the application code. This embodiment of the invention is advantageous, for example, in that for each block the information structure and the application data with their structure are known forthwith when an apparatus starts reading the information carrier at an arbitrary point, such as after a fast-forward operation of a tape-like information carrier.

According to a third aspect of the invention an arrangement comprising means for receiving the information signal defined in the opening paragraphs, means for processing the information and means for processing the application data is characterized in that the arrangement comprises means for recovering the application data from each block, means for detecting the application code, means for adapting the information processing means in dependence on the detected application code, and means for adapting the application data processing means in dependence on the detected application code. This embodiment is advantageous in that the information having different information structures can be received and processed without the necessity of transferring control information to the arrangement by a separate channel or by the user.

A further embodiment for the information receiving arrangement is characterized in that the arrangement comprises adapting means for adapting the information processing means in dependence on the application data.

A further embodiment for the information receiving arrangement is characterized in that the arrangement comprises detecting means for detecting the group application code and adapting means for adapting the application code detecting means, so that the application code is replaced by the group application code, unless a group application code has a predetermined value. This embodiment is advantageous, for example, in that if the arrangement is unsuitable for changing the information structure after each block, the application code detecting means are allowed to operate at a lower rate.

A further embodiment for the information receiving arrangement is characterized in that the arrangement comprises detecting means for detecting the volume application code and adapting means for adapting the group application code detecting means, so that the group application code is replaced by the volume application code, unless the volume application code has a predetermined value. This embodiment is advantageous, for example, in that if the arrangement is unsuitable for processing specific information structures, a volume having such an information structure can be refused forthwith.

A further embodiment for the information receiving arrangement is characterized in that the arrangement comprises reading means for reading the information signal from an information carrier on which the information signal is recorded.

According to a fourth aspect of the invention an arrangement for transmitting the information signal defined in the opening paragraphs is characterized in that the arrangement comprises means for generating the application code and means for determining the structure of the application data, both operations to be carried out in dependence on the information structure of the information.

A further embodiment for the information transmitting arrangement in which the information structure has one or more sub-structures is characterized in that the arrangement comprises means for generating application data in dependence on the substructure of the information.

A further embodiment for the information transmitting arrangement is characterized in that the arrangement comprises means for generating the group application code which code relates to all the blocks of a particular group, the group application code being equal to the application code of each of the blocks in that particular group and having a predetermined value if the blocks in the group have different application codes.

A further embodiment for the information transmitting arrangement is characterized in that the arrangement comprises means for generating a volume application code which code relates to all the groups of a particular volume, the volume application code being equal to the group application code of each of the groups in that particular volume and having a predetermined value if the groups in the volume have different group application codes.

A further embodiment for the information transmitting arrangement is characterized in that the arrangement comprises recording means for recording the information signal on said information carrier.

BRIEF DESCRIPTION OF THE DRAWINGS

The invention will be further explained with reference to the FIGS. 1 to 12 in which.

DESCRIPTION OF THE PREFERRED EMBODIMENTS

Figure 1:
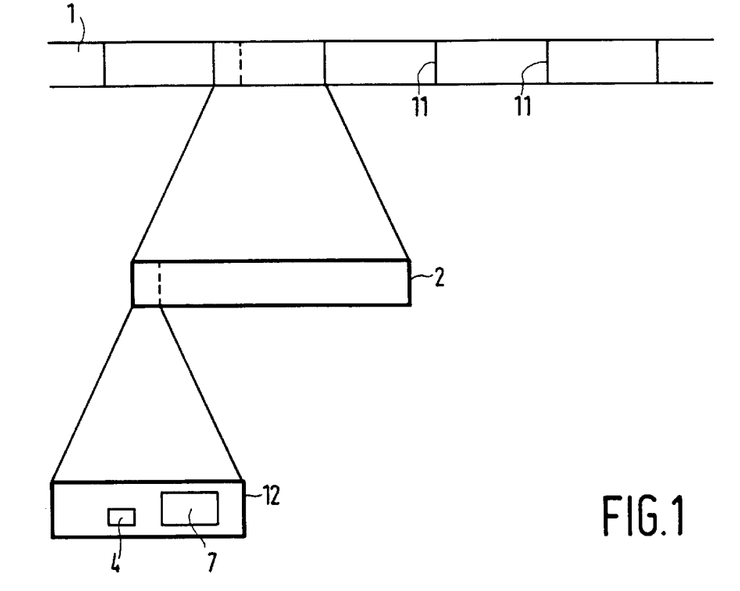
FIG. 1 shows an information signal subdivided into blocks.
Figure 5:
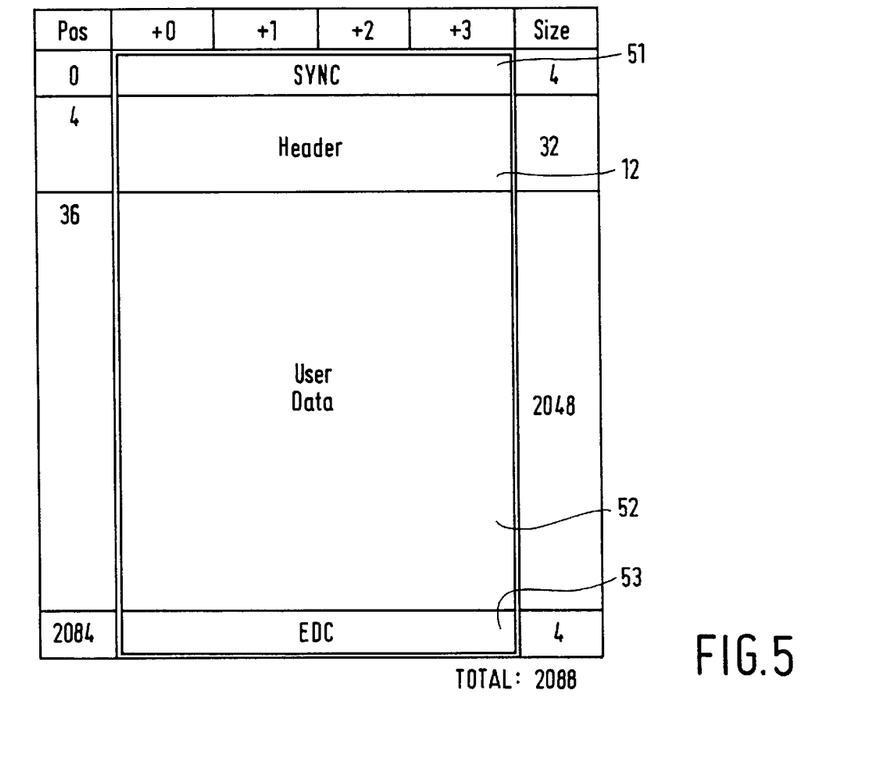
FIG. 5 shows a subdivision of a block with a header.

FIG. 1 diagrammatically shows an information signal subdivided into blocks 2. The information is contained in a symbol information flow 1 which is represented in customary fashion by a physical information signal, for example, by electrical or optical signal values. A plurality of symbols collectively represent a meaningful amount of information and are called a block 2. In the information flow 1 there are also special synchronization (sync) patterns 11 present which indicate the headings of the blocks. An amount of information, the so-called header 12, further identifying a block, is affixed to each block. FIG. 5 gives a more detailed representation of such a block with header. The symbols in a block represent information of a specific type such as, audio, video or computer software, or combinations of various types. The manner in which the symbols represent these different types of information is different, but, needless to observe this manner should always be known upon the recovery of information from the information signal. This manner of representation is called the information structure. Examples of such information structures are CD-DA (CD Digital Audio) or the CDI which is described in the title "Compact Disc-Interactive, a designer's overview", published by Kluwer (ISBN 9020121219). In addition to the information represented in this manner, many applications need supporting information relating to the information, further to be referenced application data (i.e. application control data) here. With audio information, for example, there is a need to indicate the playback time or the song texts. For other applications there is a need to indicate sub-structures of the information structure by means of the application data, such as, for example, for said CDI. Within the CDI information structure there are application data available which denote what type of information is concerned, such as video, audio etc. These application data also contain an indication as to the coding method used for storing the signal, for example, the frequency range for audio and the resolution and Colour Tables for video. Generally, the structure of the application data depends on the information structure and is thus always different. In that case the destination is to know the structure of the application data. In the method according to the invention these application data 7 are included in the blocks and each block receives an application code 4 which is indicative of the information structure, while the structure of the application data depends on the application code. These additions are preferably included in the header 12 of the block.

Figure 2:
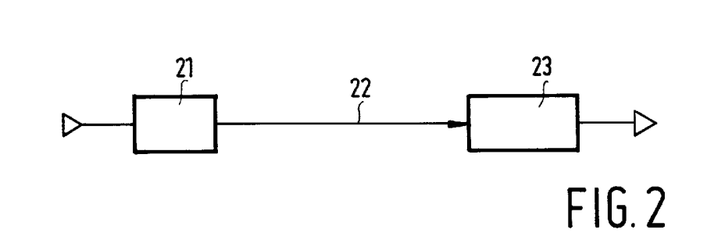
FIG. 2 shows an information transfer system.

FIG. 2 shows a system for executing an information transfer according to the invention. The system comprises an arrangement 21 for transmitting information, a channel 22 for information signal transfer and an arrangement 23 for receiving information. The transmitting arrangement will assemble the information flow from information supplied by one or more sources and/or generate information itself. Then, transmitting arrangement 21 encodes the information flow 1 in a form suitable for the transmitter channel 22. The transmitter channel 22 may be of a customary type, such as a telephone link with modems, a data network or a satellite link. The transmitter channel 22 may also utilize an information carrier on which the information signal is recorded, such as a tape or disc on which the information signal is represented in magnetic or optically readable patterns. The receiving arrangement 23 detects the information flow 1 from the information signal and processes the information according to its particular information structure, as this is known to the receiving arrangement on the basis of the application code. The application data are converted, as required, according to the structure as defined by the application code. The method is obviously not restricted to said examples of signal transfer. It is pre-eminently suitable for a system for digitally coded information transfer, in which there is no possibility of communication between source and destination previous to the actual information transfer, for example, the distribution of information on a CD or the transmission of information by radio waves or through a LAN to an unknown number of receivers of various types. The predetermined information structure used in such a communication is called a protocol in telecommunications. If such a protocol is impossible, the destination is to know the information structure. Due to the high information density and thus small redundancy, it is not simply possible to derive the information structure, which must always be implicitly available, from the information signal. If the system is capable of transferring information of more than one information structures, it is thus highly attractive to disclose the information structure and related information, for example, the error correction method or the title of the information to be transferred, in the information signal itself. With the application code and the application data it is possible for the information structure for each block to be derived from the information signal itself.

Figure 3:
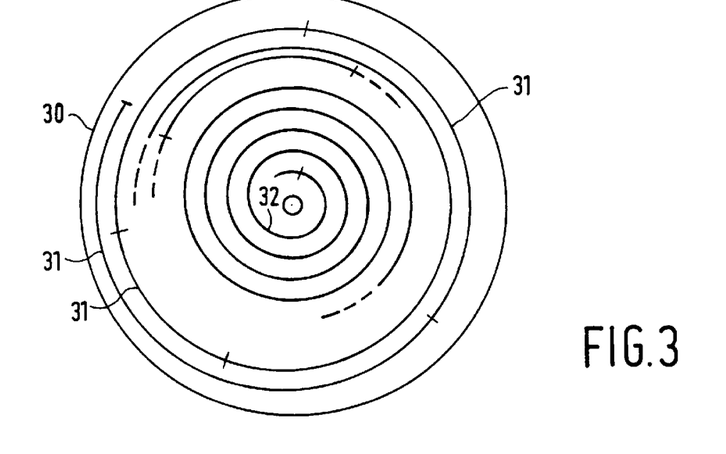
FIG. 3 shows an information carrier.
Figure 7:
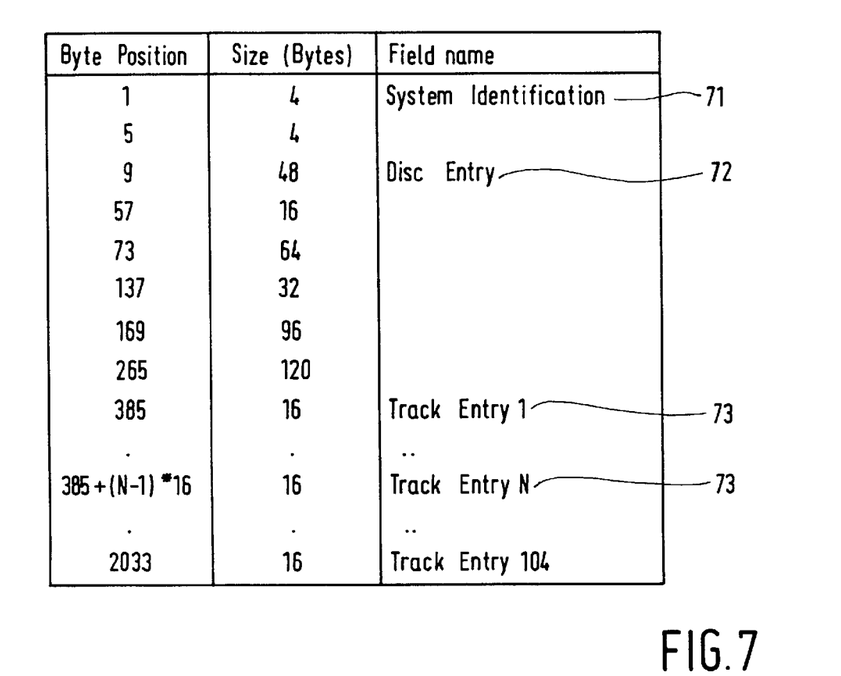
FIG. 7 shows a Table of Contents for an information carrier.

FIG. 3 shows by way of example an information carrier in the form of a disc 30 on which the information signal is recorded in a spiral, physical pattern. The disc is logically subdivided into tracks 31 which contain one or a plurality of blocks. These tracks form in this case the groups in the information flow, while the disc forms a volume. An information carrier may also comprise a plurality of volumes; such an information carrier is then referenced a multi-session carrier. A Table of Contents is recorded on the disc in an area 32 intended for this purpose. This Table of Contents contains information about the carrier and the tracks; an example of such a Table is shown in FIG. 7. From the Table of Contents there is known which blocks together form a track. An attractive option is to include a track application code for the entire track in this Table. The receiving arrangement then immediately knows the information structures of all the blocks from this Table, so that this structure need not be determined anew for each block. This reduces the necessary speed of the means for detecting and adapting the information structure. A predetermined code, for example, $FF (hexadecimal numbering system) then denotes that the blocks in a track have different application codes and that the information structure is to be determined block-by-block. The information carrier may contain, for example, information in a first format for a computer system of a first type and information of a second format for a computer system of a second type. By subdividing the information carrier into two tracks, a reading apparatus receiving an instruction from a computer system of the first or second type can simply supply to the computer system only the information of that particular information structure, without each computer system having to have a facility of distinguishing the information intended for that system from the other information. A further improvement is achieved in that the information carrier contains a volume application code. Here too a predetermined value, for example, $FF, denotes that not all the track application codes are the same. As a result, a reading apparatus can simply determine whether all the information on this information carrier can be processed or whether a further analysis per track is necessary.

Figure 4:
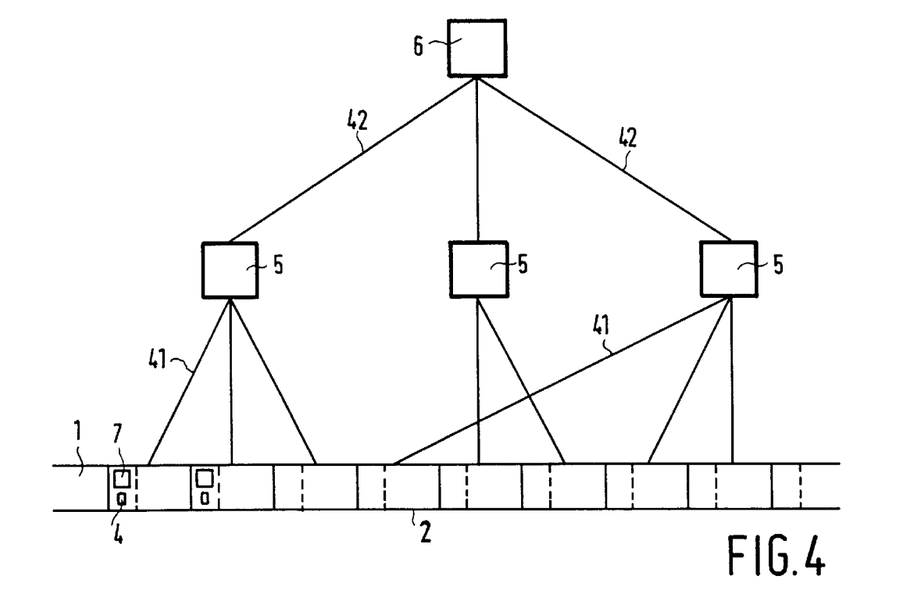
FIG. 4 shows a layered structure for application codes.

FIG. 4 shows a layered structure for application codes. Each block in the information flow 1 has an application code 4. The blocks are subdivided into groups, diagrammatically indicated by connecting lines 41. To each group is appended a group application code 5 which relates to all the blocks in the group. The groups together form a volume, as is diagrammatically shown by the lines 42. A volume application code 6 is added to the volume. Furthermore, the manner in which the information structure is determined is as described with respect to the information carrier in FIG. 3, in which, according to a hierarchical scheme, first the volume application code is detected and then the group application code, as required, and the application code of each block is detected if still necessary.

The FIGS. 5 to 9 are shown in Tables in which the position and length of the items in the Table are stated in bytes. They merely serve as examples.

FIG. 5 shows the structure of a block. At the beginning of the block sync symbols 51 are positioned which indicate the start of the block. They are followed by the header 12 and then the field 52 for the information of a particular information structure. Finally, several symbols 53 are added, which make it possible to detect errors that have arisen somewhere in the block during the transfer.

Figure 6:
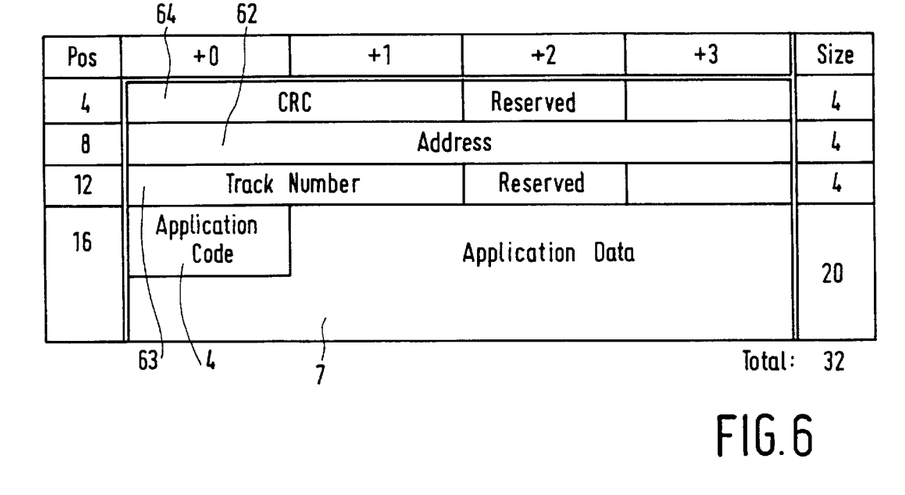
FIG. 6 shows a header of a block containing an application code and application data.

FIG. 6 shows a header of a block with application code 4 and application data 7. As is customary, such a header contains an address 62 which uniquely identifies the block. In addition, this header contains a track number 63, so that it is possible to detect the track number even without consulting the Table of Contents. Alternatively, it is possible for block number 63 to include blocks of different track numbers in a random order in the information flow 1. Since it is of the utmost importance for the processing of the information of the block that the information of the header be correct, a check code 64 of the customary CRC Cyclic Redundancy Check type is added. By such a code it is possible in a simple and highly reliable manner to check whether the information in the header contains errors.

FIG. 7 shows an embodiment for a Table of Contents for the disc 30. This Table of Contents contains a system identification 71 and is further subdivided into fields for different types of information concerning the information carrier. The field 72 contains a disc identification Table and is shown in detail in FIG. 8. Furthermore, fields 73 are reserved for a track identification Table of each track, whose contents are shown in FIG. 9.

Figure 8:
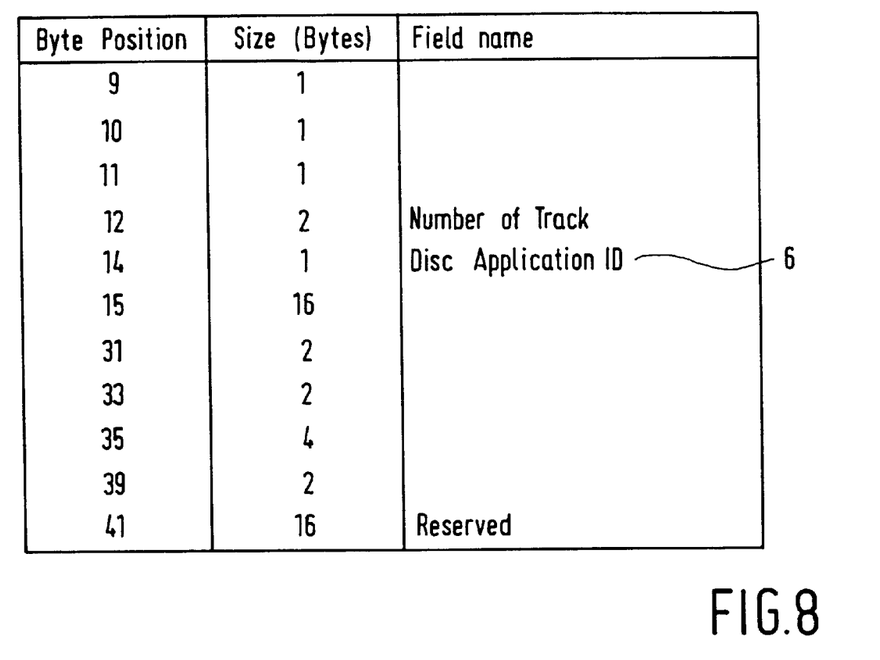
FIG. 8 shows a disc identification Table with volume application code.

The disc identification Table shown in FIG. 8 may include, for example, data such as the number of tracks on the disc. The disc identification Table is furthermore an eminent location for the volume application code 6.

Figure 9:
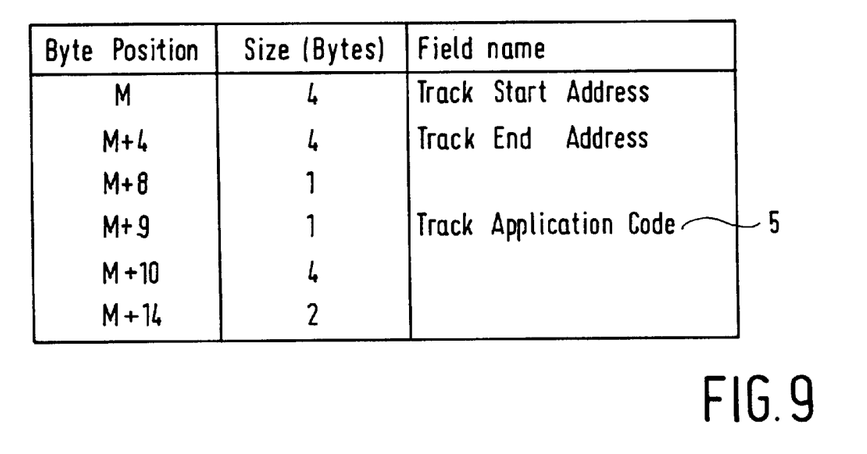
FIG. 9 shows a track identification Table with track application code.

FIG. 9 shows a track identification Table. Such a track identification Table is repeated for each track in the Table of Contents of the disc. This track identification Table may contain, for example, data such as the address of the first and the last block in the track.

A track forms in this case a group. The track identification Table is thus also a suitable location for the group application code 5.

Figure 10:
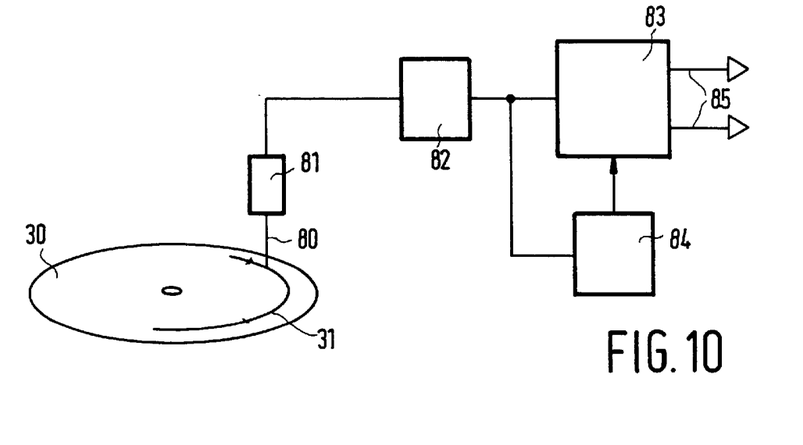
FIG. 10 shows an arrangement for receiving information with an information carrier.

FIG. 10 shows an arrangement for receiving information stored on disc 30. The disc 30 is scanned by a radiation beam 80 focused at the disc by a radiation unit 81. The reflected radiation is influenced by the effects on the disc that represent the information signal. The radiation unit 81 derives the information signal from this reflected radiation. A system controller of a customary type (not shown) controls the speed of rotation of the disc and the positioning of the radiation unit 81 over the track 31. The synchronization (sync) unit 82 converts the information flow 1 from the information signal and isolates the blocks in this information flow in response to the sync patterns 11. From the sync unit 82 the blocks are transferred to the processing unit 83 and to the detecting unit 84. From the processing unit the information goes to one or more destinations through outputs 85. These destinations could be, for example, an audio system and a picture screen. The application codes are detected in the detecting unit 84 and are used for setting the processing unit for processing the information according to a particular information structure. If the information structure is, for example, the CDI structure, the processing unit 83 is first to derive the application data from each block, because these application data denote what sub-structure the information in the block has, such as, for example, an audio signal encoded according to a specific compression algorithm. Besides, the detecting unit 84 may also comprise means for detecting the track application code and the volume application code. The detecting unit may utilize the track application code and the volume application code to provide a once-only setting of the processing unit for a longer period of time, as has also been described with reference to FIG. 3. The detecting unit may also pass on the track application code and volume application code to the system controller and this system controller may then skip that particular track or refuse the entire information carrier if an arrangement is incapable of processing that particular information structure, or if the user has instructed the system controller to read a specific type of information from the information carrier. There may also be various processing units (not shown) in which the blocks are transferred to the correct processing unit in response to the application codes.

Figure 11:
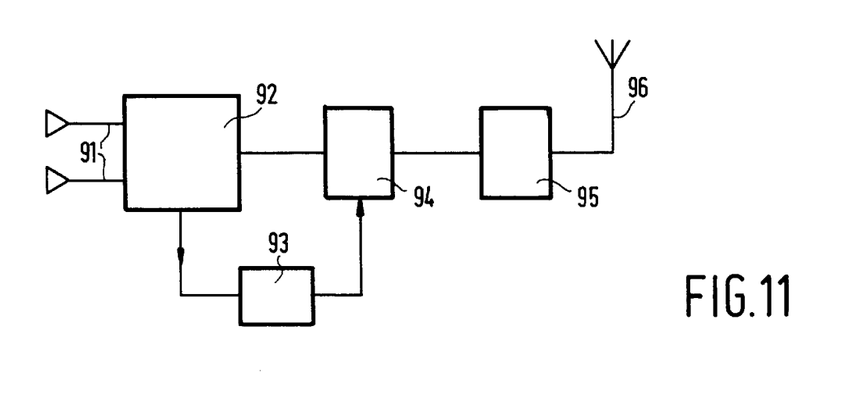
FIG. 11 shows an arrangement for transmitting information via a radio signal.

FIG. 11 shows an arrangement for transmitting information. Information from one or more sources 91, such as a microphone, or graphical computer data, is encoded into the desired information structure and subdivided into blocks by a processing unit 92. A generator 93 determines the application code, the group application code and the volume application code in response to the information structure. The system controller (not shown) is instructed by a user to make a subdivision of information into groups and volumes, and this subdivision is passed on to the generator 93. The information flow is converted into an information signal by sync unit 94 and provided with the sync patterns 11. The transmitter unit 95 amplifies the information signal, for example, modulates same on an information carrier and, via antenna 96, transmits the information signal to one or more receivers. The arrangement shown may be, for example, a radio transmitter station in which traffic information which has a second information structure is co-transmitted with the musical signal which has a first information structure. A group may then be used to describe a district and a volume to describe a country. A third information structure could then, for example, be the co-transmission of the song texts, so that they may be shown on a receiver. A group may then be a track and a volume may then a program. For such a layout it is desirable also to include the group number in the header of each clock, because in that case the blocks having different information structures can be transmitted alternately. For example, the audio information is to be converted into an uninterrupted flow at the destination, and is thus of a so-defined real-time nature. If the other blocks caused large interruptions in the audio information flow, this would necessitate large memories in the receiving arrangement and result in an additional delay between transmission and reception.

Figure 12:
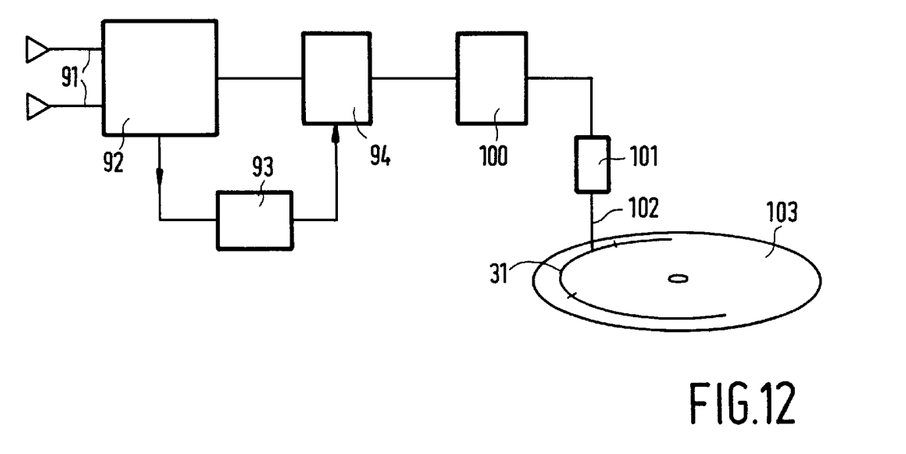
FIG. 12 shows an arrangement for transmitting information via a master information carrier.

FIG. 12 shows an arrangement for transmitting information, in which the information is distributed on information carriers. First a master information carrier is made with the arrangement shown. From this master information carrier a multiplicity of information carriers is then made by a customary process with moulds and presses (not shown). In this arrangement a processing unit 92 encodes the information from one or more sources 91, such as a video camera, or a computer program and application data such as subtitling into the desired information structure and subdivides this information into blocks. The distribution of information over the tracks is determined, for example, by an editor and passed on to the generator 93. The generator 93 determines the application code, the track application code and the volume application code as a function of the information structure, and stores the structure of the application data in sync unit 94. The information flow is converted into an information signal by sync unit 94 and provided with the sync patterns 11. Channel coding unit 100 encodes the information signal in a manner suitable for the disc-like information carrier and transfers the information signal to the radiation unit 101. Radiation unit 101 introduces effects on the master information carrier 103 by radiation beam 102. A system controller of a customary type (not shown) provides the control of the speed of rotation of the disc and the positioning of the radiation unit 101 over the track 31.

The embodiments for the arrangements are not restricted to the examples of FIGS. 10, 11 and 12 and may comprise any arrangement for receiving and/or transmitting information, in which an application code and application data, as required, are included in the information flow in the manner described in the method.

I claim:

1. A method of transferring information organized into one or more information structures by an information signal, the information comprising user data relating to an application and application control data relating to the user data, each information structure identifying how the user data and application control data of a predetermined application is organized, comprising subdividing the information signal into blocks wherein each block comprises a field for the user data and a header containing the application control data and an application code that is indicative of the information structure used in that block.

2. The method as claimed in claim 1, in which the information structure comprises one or more sub-structures, characterized in that the sub-structure in each block depends on the application control data.

3. The method as claimed in claim 1, in which the information signal is subdivided into groups and a group comprises a plurality of blocks, characterized in that the group contains a group application code that relates to all the blocks of that particular group.

4. The method as claimed in claim 3, characterized in that the group application code is equal to the application code of each of the blocks in that particular group and has a predetermined value if the blocks in the group have different application codes.

5. The method as claimed in claim 3, in which the information signal is subdivided into volumes and a volume comprises a plurality of groups, characterized in that the volume has a volume application code that relates to all the groups of that particular volume.

6. The method as claimed in claim 5, characterized in that the volume application code is equal to the group application code of each of the groups in that particular volume and has a predetermined value if the groups in the volume have different group application codes.

7. An information carrier, comprising an information signal recorded thereon which represents information organized into one or more information structures, the information comprising user data relating to an application and application control data relating to the user data, each information structure identifying how the user data and application control data of a predetermined application is organized, the information signal being subdivided into blocks wherein each block comprises a field for the user data and a header containing the application control data and an application code that is indicative of the information structure used in that block.

8. The information carrier as claimed in claim 7 in which the information structure comprises one or more sub-structures, characterized in that the sub-structure in each block depends on the application control data.

9. The information carrier as claimed in claim 7, subdivided into tracks and containing a Table of Contents and in which a track comprises a plurality of blocks, characterized in that the Table of Contents contains a track application code for each track which code relates to all the blocks of that particular track.

10. The information carrier as claimed in claim 9, characterized in that the track application code is equal to the application code of each of the blocks in that particular track and has a predetermined value if the blocks in the track have different application codes.

11. The information carrier as claimed in claim 9, characterized in that the information carrier contains a volume application code relating to all the tracks in at least a specific area of the information carrier.

12. The information carrier as claimed in claim 11, characterized in that the volume application code is equal to the track application code of each of the tracks in that particular area of the information carrier and has a predetermined value if the tracks have different track application codes.

13. An arrangement for implementing the method as claimed in claim 1, the arrangement comprising means for receiving the information signal, means for processing the application control data, characterized in that the arrangement comprises means for recovering the application control data from each block, means for detecting the application code and means for adapting the processing means in dependence on the detected application code.

14. The arrangement as claimed in claim 13, characterized in that the arrangement comprises adapting means and means for processing the user data in response to the application data.

15. The arrangement as claimed in claim 13, characterized in that the arrangement comprises detecting means for detecting the group application code and adapting means for adapting the application code detecting means, so that the application code is replaced by the group application code, unless a group application code has a predetermined value.

16. The arrangement as claimed in claim 13, characterized in that the arrangement comprises detecting means for detecting the volume application code and adapting means for adapting the group application code detecting means, so that the group application code is replaced by the volume application code, unless the volume application code has a predetermined value.

17. The arrangement as claimed in claim 13, characterized in that the receiving means comprise reading means for reading the information signal from an information carrier on which the information signal is recorded.

18. The arrangement to be used in the method as claimed in claim 1 which arrangement comprises transmitting means for transmitting the information signal, characterized in that the arrangement comprises means for generating the application code and means for determining the structure of the application control data, both operations to be carried out in dependence on the information structure of the information.

19. The arrangement as claimed in claim 18, in which the information structure has one or more sub-structures, characterized in that the arrangement comprises means for generating application control data in dependence on the sub-structure of the information.

20. The arrangement as claimed in claim 18, characterized in that the arrangement comprises means for generating the group application code which code relates to all the blocks of a particular group, the group application code being equal to the application code of each of the blocks in that particular group and having a predetermined value if the blocks in the group have different application codes.

21. The arrangement as claimed in one claim 18, characterized in that the arrangement comprises means for generating a volume application code which code relates to all the groups of a particular volume, the volume application code being equal to the group application code of each of the groups in that particular volume and having a predetermined value if the groups in the volume have different group application codes.

22. The arrangement as claimed in claim 18, characterized in that the transmitting means comprise recording means for recording the information signal on an information carrier.

23. The method as claimed in claim 2, in which the information signal is subdivided into groups and a group comprises a plurality of blocks, characterized in that the group contains a group application code that relates to all the blocks of that particular group.

24. The method as claimed in claim 4, in which the information signal is subdivided into volumes and a volume comprises a plurality of groups, characterized in that the volume has a volume application code that relates to all the groups of that particular volume.

25. The information carrier as claimed in claim 8, subdivided into tracks and containing a Table of Contents and in which a track comprises a plurality of blocks, characterized in that the Table of Contents contains a track application code for each track which code relates to all the blocks of that particular track.

26. The information carrier as claimed in claim 10, characterized in that the information carrier contains a volume application code relating to all the tracks in at least a specific area of the information carrier.

27. The information carrier as claimed in claim 25, characterized in that the track application code is equal to the application code of each of the blocks in that particular track and has a predetermined value if the blocks in the track have different application codes, that the information carrier contains a volume application code relating to all the tracks in at least a specific area of the information carrier and that the volume application code is equal to the track application code of each of the tracks in that particular area of the information carrier and has a predetermined value if the tracks have different track application codes.

28. The arrangement for implementing the method as claimed in one of the claim 5, the arrangement comprising means for receiving the information signal, means for processing the application control data, characterized in that the arrangement comprises means for recovering the application control data from each block, means for detecting the application code and means for adapting the processing means in dependence on the detected application code.

29. The arrangement as claimed in claim 14, characterized in that the arrangement comprises detecting means for detecting the group application code and adapting means for adapting the application code detecting means, so that the application code is replaced by the group application code, unless a group application code has a predetermined value.

30. The arrangement as claimed in one of the claim 15, characterized in that the arrangement comprises detecting means for detecting the volume application code and adapting means for adapting the group application code detecting means, so that the group application code is replaced by the volume application code, unless the volume application code has a predetermined value.

31. The arrangement as claimed in one of the claim 16, characterized in that the receiving means comprise reading means for reading the information signal from an information carrier on which the information signal is recorded.

32. The arrangement to be used in the method as claimed in one of the claim 5, which arrangement comprises transmitting means for transmitting the information signal, characterized in that the arrangement comprises means for generating the application code and means for determining the structure of the application control data, both operations to be carried out in dependence on the information structure of the information.

33. The arrangement as claimed in claim 19, characterized in that the arrangement comprises means for generating the group application code which code relates to all the blocks of a particular group, the group application code being equal to the application code of each of the blocks in that particular group and having a predetermined value if the blocks in the group have different application codes.

* * * * *

UNITED STATES PATENT AND TRADEMARK OFFICE
CERTIFICATE OF CORRECTION

PATENT NO.      : 5,920,874
DATED           : July 6, 1999
INVENTOR(S)     : Johannes J. Mons It is certified that error appears in the above-identified patent and that said Letters Patent is hereby corrected as shown below:

<u>Column 12,</u>
Lines 20, 33, 40 and 45, delete "one of the".

Signed and Sealed this

Twenty-sixth Day of November, 2002

*Attest:*

JAMES E. ROGAN
*Attesting Officer*         *Director of the United States Patent and Trademark Office*